UNITED STATES PATENT OFFICE.

HENRY V. P. DRAPER, OF HANNIBAL, MISSOURI, ASSIGNOR OF ONE-HALF HIS RIGHT TO PETER B. GROAT, OF SAME PLACE.

IMPROVEMENT IN LUBRICATING COMPOUNDS.

Specification forming part of Letters Patent No. 171,508, dated December 28, 1875; application filed October 4, 1875.

*To all whom it may concern:*

Be it known that I, HENRY V. P. DRAPER, a resident of Hannibal, Marion county, State of Missouri, have invented a new and useful Improvement in Lubricating Compounds, of which the following is a full, clear, and exact description:

My aim is to provide a cheap, durable, incombustible lubricant, free from acid, grit, and gum, and which is not decomposed by friction.

To prepare the lubricant, take petroleum in any of its commercial forms, or of any degree of purity, and to it add a saturated solution of lime-water. The latter is poured into the oil gradually, meanwhile stirring constantly and until the lime solution is thoroughly incorporated in the oil. Add the lime-water until the mixture begins to thicken or become soapy. The stirring is kept up until the color of the mixture becomes a dark brown, and it is improved by stirring it until it is of a light drab. Then, with the compound thus formed, I combine any kind of animal fat, in the ratio of one pound of animal fat to one gallon of the compound. While adding the fat, the stirring is maintained.

It is equally practicable to combine the petroleum and animal fat first, and afterward to add the lime-water. The precise amount of lime-water to add cannot, in advance, be named, as different oils take up different quantities of lime-water. A less amount of the animal fat than above named can be combined with the other elements with advantageous results.

I am aware that petroleum and animal fat alone have heretofore been combined; and, also, to correct any rancidity that may exist in the animal fat, a solution of lime and sulphate of zinc has been added to the animal fat (and at such a degree of heat as to evaporate the water from the lime and zinc) previous to the addition of the petroleum, and that afterward, when the latter is added, a high degree of heat is maintained. Such a process and compounds, even if new with me, would not answer my purpose, and I disclaim them; but

What I claim is—

1. The herein-described lubricating compound, consisting of petroleum, animal fat, and lime-water, substantially as described.

2. The herein-described process of manufacturing a lubricating compound from petroleum, animal fat, and lime-water, substantially as described.

HENRY V. P. DRAPER.

Witnesses:
CHAS. MCCORMIC,
G. A. ELLEGOOD.